United States Patent [19]

Stern et al.

[11] Patent Number: 5,089,594
[45] Date of Patent: Feb. 18, 1992

[54] WHOLLY AROMATIC POLYESTER OF ISOPHTHALIC ACID, TEREPHTHALIC ACID, P-HYDROXYBENZOIC ACID, HYDROQUINONE AND AN ARYLENE DIOL

[75] Inventors: Brian A. Stern, Evans, Ga.; Markus Matzner, Edison, N.J.; Richard Layton, Augusta, Ga.

[73] Assignee: Amoco Corporation, Chicago, Ill.

[21] Appl. No.: 499,481

[22] PCT Filed: Oct. 10, 1989

[86] PCT No.: PCT/US89/04329

§ 371 Date: Jun. 4, 1990

§ 102(e) Date: Jun. 4, 1990

[87] PCT Pub. No.: WO90/03992

PCT Pub. Date: Apr. 19, 1990

Related U.S. Application Data

[63] Continuation-in-part of Ser. No. 255,670, Oct. 11, 1988, abandoned, and a continuation-in-part of Ser. No. 317,525, Mar. 1, 1989, abandoned.

[51] Int. Cl.⁵ .................. C08G 63/02; C08G 63/18; C08J 1/00

[52] U.S. Cl. ..................... 528/194; 524/35; 524/601; 528/176; 528/191; 528/193

[58] Field of Search ............... 524/35, 601; 528/176, 528/191, 193, 194

[56] References Cited

FOREIGN PATENT DOCUMENTS

3629211 3/1988 Fed. Rep. of Germany .

*Primary Examiner*—Harold D. Anderson
*Assistant Examiner*—T. Mosley
*Attorney, Agent, or Firm*—Matthew R. Hooper; William H. Magidson; Ralph C. Medhurst

[57] ABSTRACT

Aromatic polyesters based on isophthalic acid, terephthalic acid, p-hydroxybenzoic acid, hydroquinone and an arylene diol are described. The five monomers ae used in well-specified proportions and yield polymers that display an excellent overall combination of mechanical and thermal properties. The subject copolyesters have melting points of at least about 260° C.; their heat distortion temperatures are at least about 200° C. they have fiber ratings of up to 3. The novel polymers can be melt-fabricated using standard injection molding, extrusion and melt-spinning techniques.

9 Claims, 3 Drawing Sheets

WHOLLY AROMATIC POLYESTER OF ISOPHTHALIC ACID, TEREPHTHALIC ACID, P-HYDROXYBENZOIC ACID, HYDROQUINONE AND AN ARYLENE DIOL

CROSS REFERENCE TO RELATED APPLICATION

This application is a continuation-in-part of U.S. patent application, Ser. No. 255,670 filed Oct. 11, 1988, now abandoned and a continuation-in-part of U.S. Ser. No. 07/317,525, filed Mar. 1, 1989, now abandoned.

FIELD OF THE INVENTION

Aromatic polyesters based on isophthalic acid, terephthalic acid, p-hydroxybenzoic acid, hydroquinone and an arylene diol are described. The five monomers are used in well-specified proportions and yield polymers that display an excellent overall combination of mechanical and thermal properties. The subject copolyesters have melting points of at least about 260° C.; their heat distortion temperatures are at least about 200° C. They have fiber ratings of up to 3. The novel polymers can be melt-fabricated using standard injection molding, extrusion and melt-spinning techniques.

BACKGROUND OF THE INVENTION

Wholly aromatic polyester resins have long been known. For instance, 4-hydroxybenzoic acid homopolymer and copolymers have been provided in the past and are commercially available. Such polymers are commonly crystalline in nature, relatively high-melting or possess a decomposition temperature which is below the melting point, and when molten frequently exhibit orientation in the melt.

The homopolymer of p-hydroxybenzoic acid is a very high-melting, insoluble material and, hence, very difficult to fabricate. Melting points as high as 610° C. were quoted—see W. J. Jackson, *The British Polymer Journal*, December 1980, p. 155. In order to depress the high melting point of the homopolymer so as to make it melt-fabricable, a variety of materials incorporating different types of comonomers were prepared over the years.

One such material is, for example, the resin made from p-hydroxybenzoic acid (PHBA), isophthalic (IA) and/or terephthalic acids (TA), and 4,4'-biphenol (BP) as described in, for example, Cottis et al., U.S. Pat. Nos. 3,637,595 and 3,975,487. The polymer has outstanding high-temperature properties; it can be molded to give articles of high modulus and strength. It is offered commercially by Amoco Performance Products, Inc. under the tradename of XYDAR ®. Due to the use of PHBA and BP, these polymers can be expensive.

A related class of wholly aromatic polyesters based on p-hydroxybenzoic acid, isophthalic and terephthalic acids, and hydroquinone (HQ) is claimed in commonly assigned U.S. patent application entitled "Hydroquinone Poly (Iso-Terephthalates) Containing Residues of p-Hydroxybenzoic Acid," Ser. No. 07/255,670, filed in the names of R. Layton et al., on Oct. 11, 1988, which is hereby incorporated by reference. The polymers described in the latter application display high modulus and high strength; they have melting points in the range of from 340° C. to 400° C., are melt-processible, and show orientation in the molten state. Compositions filled with about 30 weight percent of glass fibers display heat distortion temperatures (HDT's) of about 240° C. to about 280° C., when measured under a load of 264 psi.

While the overall combination of properties of the above resins is outstanding compared to prior art wholly aromatic polyesters based on p-hydroxybenzoic acid, benzene dicarboxylic acids and hydroquinone, they are preferably used in blends with polyesters made from p-hydroxybenzoic acid, isophthalic and terephthalic acids and 4,4'-biphenol to facilitate moldability and minimize blistering of large molded parts. In addition, these novel blends display improved mechanical properties; composites containing 30 weight percent of glass fibers show heat distortion temperatures (under a load of 264 psi) of at least 240° C. The subject blends are claimed in commonly assigned U.S. patent application of P. Huspeni et al., entitled "Polymer Compositions Having Improved Molding Characteristics," Ser. No. 07/255,632, filed on Oct. 11, 1988. These cases are hereby incorporated by reference.

Also, we filed concurrently herewith two applications to heat resistant and high-strength polymers and blends of hydroquinone poly (Iso-Terephthalates) containing residues of p-hydroybenzoic acid by R. Layton et al. which are a continuation-in-part of U.S. Ser. Nos. 255,670 and 255,632 filed Oct. 11, 1988, our case Nos. 29723 and 29724. These polymers and blends have good mechanical properties, good fiber ratings and ability to vapor phase solder.

We considered that if it is possible to incorporate many or all of the desirable properties of a blend into a single polymer in order to avoid producing two different polyesters, it would be desirable.

We have now found that wholly aromatic polyesters based on five components, i.e., p-hydroxybenzoic acid, isophthalic and terephthalic acids, hydroquinone, and an arylene diol such as 4,4'-biphenol, for example, used in specified proportions, display excellent mechanical properties, good moldability, high melting points, high HDT's, good fiber ratings, and yield molded parts having very good surface characteristics.

The present discovery was surprising since with some known exceptions, blends of polymeric materials are generally different from polymers. They are immiscible, that is, they consist of domains of chemically distinct phases. Usually, one component forms a continuous phase, while the other component forms roughly spherical domains as inclusions. Under some circumstances, bi-continuous structures are also obtainable. Hence, a blend of two polymers is usually a two-phase system whose properties reflect those of both phases present. On the other hand, a random copolymer is a one-phase material wherein the properties of the constituents are averaged. Thus, a copolymer is expected to be quite different from a two-phase blend. Even if the monomers employed to make the component polymers of the blend were to be the same as those employed to make the corresponding random copolymer, one would not expect similar characteristics for the two systems. In addition, the known prior art suggests that one would not be able to find any useful materials in the compositional region of the instant invention. In fact, the prior art teaches away from the compositional ranges of the current invention.

As indicated in application Ser. No. 07/255,670 filed Oct. 11, 1988 by R., Layton et al. and assigned to Amoco Inc., the prior art has been unsuccessful in replacing biphenol with hydroquinone without sacrificing properties and/or using expensive comonomers. While various references discussed below have suggested employing mixtures of hydroquinone and a second arylene diol, none of these describe the polymers of this invention.

Dicke et al., U.S. Pat. No. 4,603,190, claim five component copolyesters based on terephthalic acid, isophthalic acid, p-hydroxybenzoic acid, hydroquinone and 4,4'-biphenol wherein the terephthalic acid to isophthalic acid ratio is equal to or less than one. The polymers display Vicat B temperatures of about 130° C. to about 150° C., which translate into even lower HDT's. Polymers with such low Vicat B temperature would be of no interest in applications which require dimensional stability at high temperatures (e.g. equal to or greater than about 200° C.).

Portugall et al., U.S. Pat. No. 4,751,128, claim five similar component polyesters wherein the molar ratios of terephthalic to isophthalic acids vary from 1.04:1 to 19:1; and wherein the hydroquinone to 4,4'-biphenol molar ratios are in the range of 0.1:1 to 2.67:1. The copolymers appear to have a satisfactory combination of mechanical and thermal properties with HDT's of up to 248° C. The drawback of the materials, however, is their high cost due to the rather low ratio of the inexpensive hydroquinone to the very expensive 4,4'-biphenol. In fact, U.S. Pat. No. 4,751,128 suggests that there are no compositions of interest at hydroquinone to 4,4'-biphenol molar ratios greater than 2.67:1; indeed, according to the patent, it is preferred that the subject ratio be no higher than 2.33:1 (column 2, lines 24–26).

Okamoto et al., European Patent Application No. 275,324, disclose and claim aromatic polyesters from isophthalic and terephthalic acids, p-hydroxybenzoic acid, hydroquinone, 4,4'-biphenol, and, optionally, a sixth comonomer selected from 2,6-naphthalene diol, or an alkyl- or chloro- substituted hydroquinone. Once again, the mole ratio of hydroquinone to the 4,4'-biphenol is low, i.e. from 1:1 to 1:19. In fact, polymers outside of the molar percentage criteria are considered undesireable. The application discloses (p. 6) that if the mole percentage of biphenol is less than 50 mole percent (i.e., the HQ/BP ratio is greater than 1:1), "the heat resistance is poor" (line 9, p. 6); while if the mole percentage of biphenol is more than 0.95 mole percent (i.e., the HQ/BP ratio is lower than 1:19), the resulting polymers have poor flow characteristics (See also p. 6). It is noteworthy, that copolymers with hydroquinone/4,4'-biphenol molar ratios greater than one could not be prepared since they solidified during polymerization (see lines 12–17, p. 14; and Table 2, p. 15).

Analysis of the foregoing patents (i.e. U.S. Pat. Nos. 4,603,190 and 4,751,128; and European Patent Application No. 275,324) also indicates that the polyesters described therein comprise high amounts of another expensive monomer, namely, p-hydroxybenzoic acid (PHBA). Contrary to the commonly held belief that good high-temperature properties of wholly aromatic polyesters can be achieved only at high contents of p-oxybenzoyl moieties, it was now unexpectedly discovered that materials exhibiting excellent high temperature performance can be obtained at very low PHBA contents; even at terephthalic acid to isophthalic acid ratios of less than one.

Cottis et al., U.S. Pat. No. 4,563,508, suggest the possibility of preparing copolyesters from terephthalic and isophthalic acids, p-hydroxybenzoic acid, hydroquinone and 4,4'-biphenol. Cottis, U.S. Pat. No. 4,563,508, is directed to the improvement of molding compounds based on wholly aromatic polyesters by the addition of a minor amount of a flow modifier. The flow modifier crystallizes poorly and improves the flow of the highly crystallized base polymer it is added to. The flow modifier does not enhance the end properties of the blend composition. It is to be noted that the addition of the flow modifier decreases the HDT of the composition and does not increase the strength. The patent does not describe any compositions within the scope of this invention.

In summary, therefore, the possibility of preparing polyesters from terephthalic acid, isophthalic acid, p-hydroxybenzoic acid, hydroquinone and an arylene diol such as 4,4'-biphenol, for example; with high molar ratios of hydroquinone/arylene diol [e.g. ≧3:1 and at low PHBA contents, e.g., about 0.4 to 0.6 (vide infra)]; having both the desirable thermal, mechanical and molding characteristics as hereinbelow described; and very attractive economics was surprising and totally unexpected. In fact, the teachings of the prior art are contrary to our discoveries.

BRIEF DESCRIPTION OF THE FIGURES

FIG. I is a compositional diagram in which the trapezoidal region delineated therein corresponds to polyester compositions of the present invention in which the mole ratio of oxybenzoyl units to the sum of terephthalic and isophthlic units is within the range of from about 0.6:1 to about 7:1 and the mole ratio of terephthalic units to isophthalic units is within the range of from about 1.4:1 to about 10:1.

FIG. II is a compositional diagram, similar to FIG. I, in which the trapezoidal region corresponds to polyester compositions of the present invention in which the mole ratio of oxybenzoyl units to the sum of terephthalic and isophthalic units is within the range of from about 0.15:1 to about 0.8:1 and the mole ratio of terephthalic units to isophthalic units is within the range of from about 0.42:1 to about 2.33:1.

FIG. III is a compositional diagram which illustrates both of the compositional regions of FIGS. I and II simultaneously.

THE INVENTION

Figure 1:
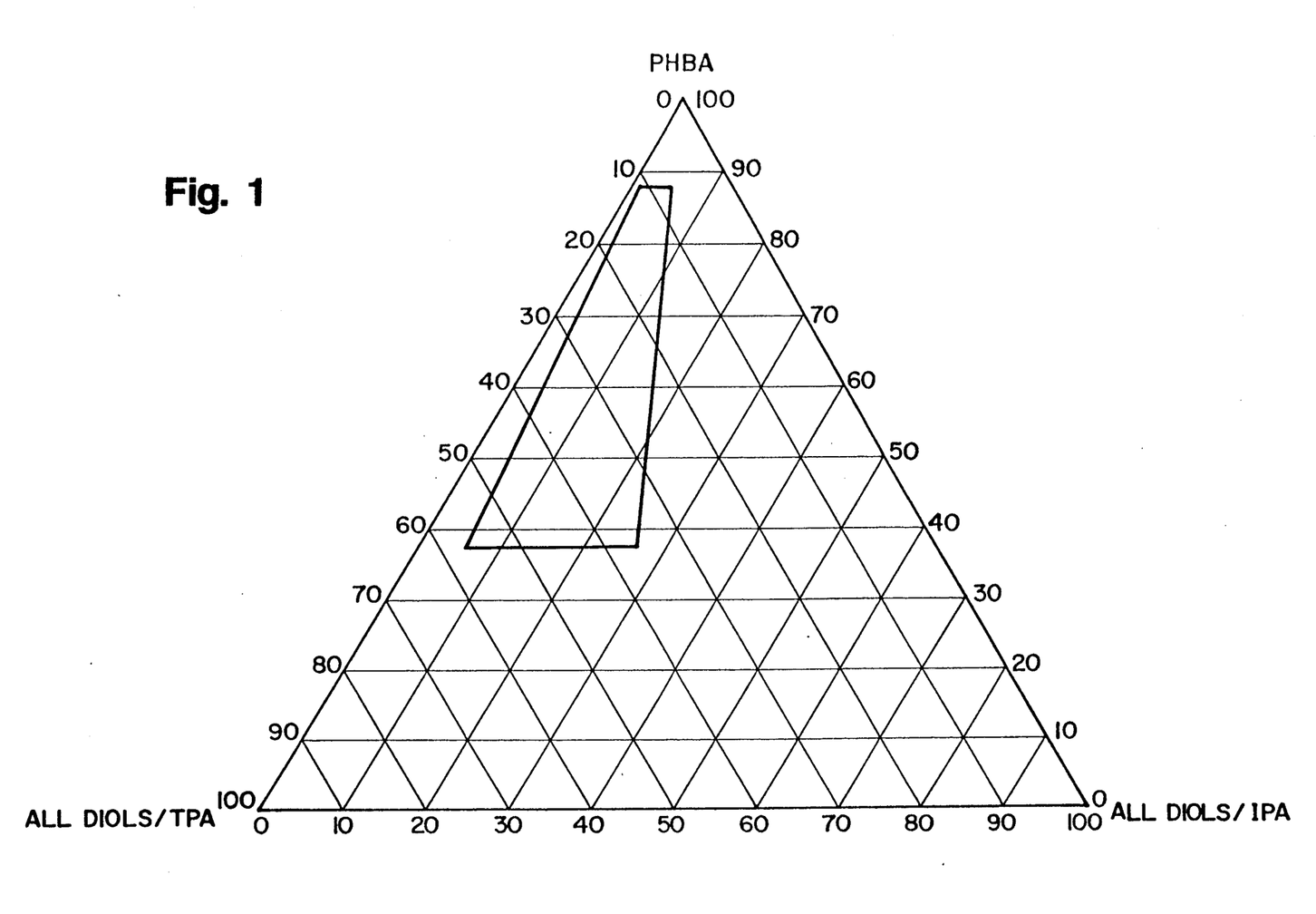
Figure 2:
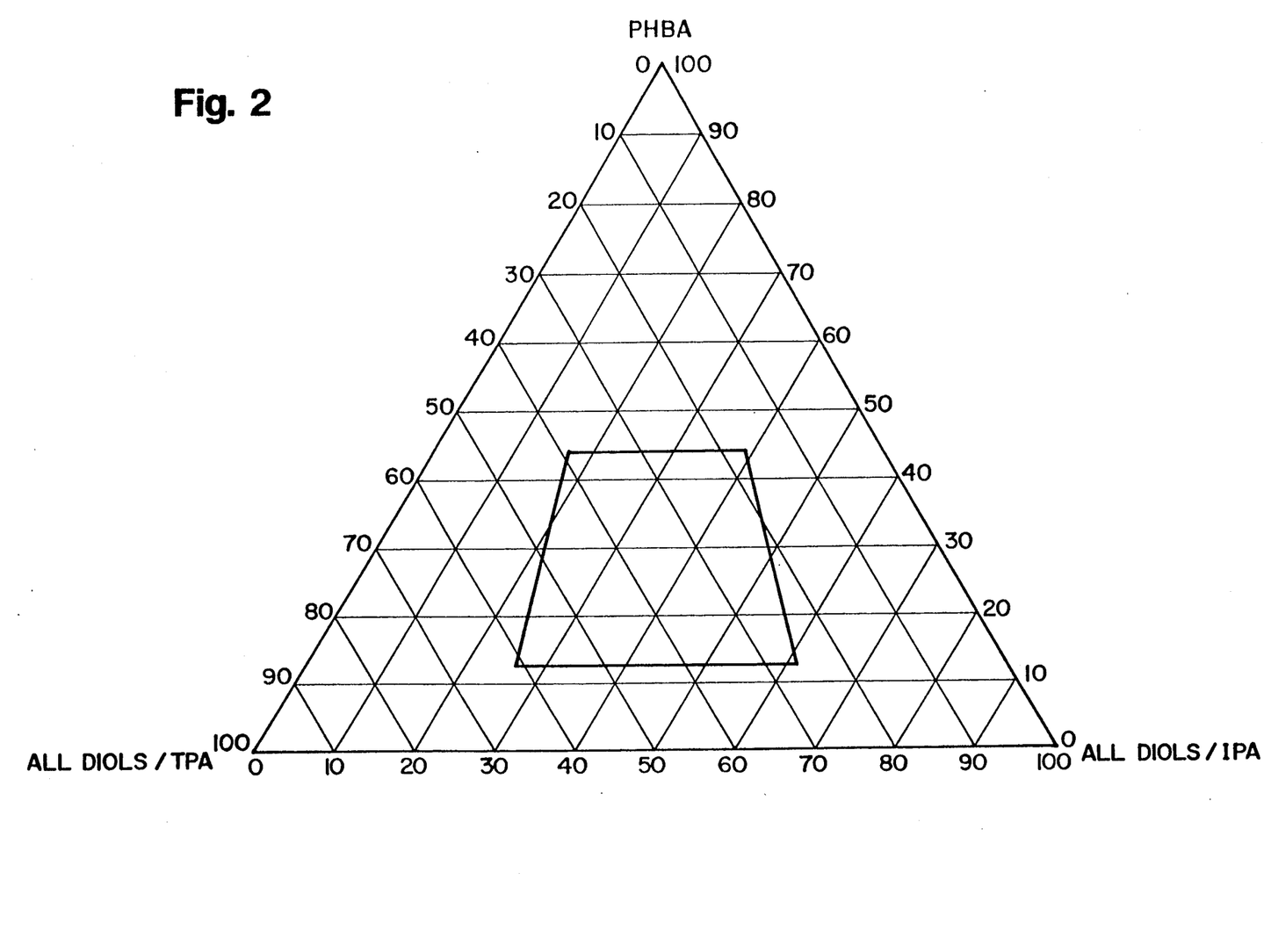
Figure 3:
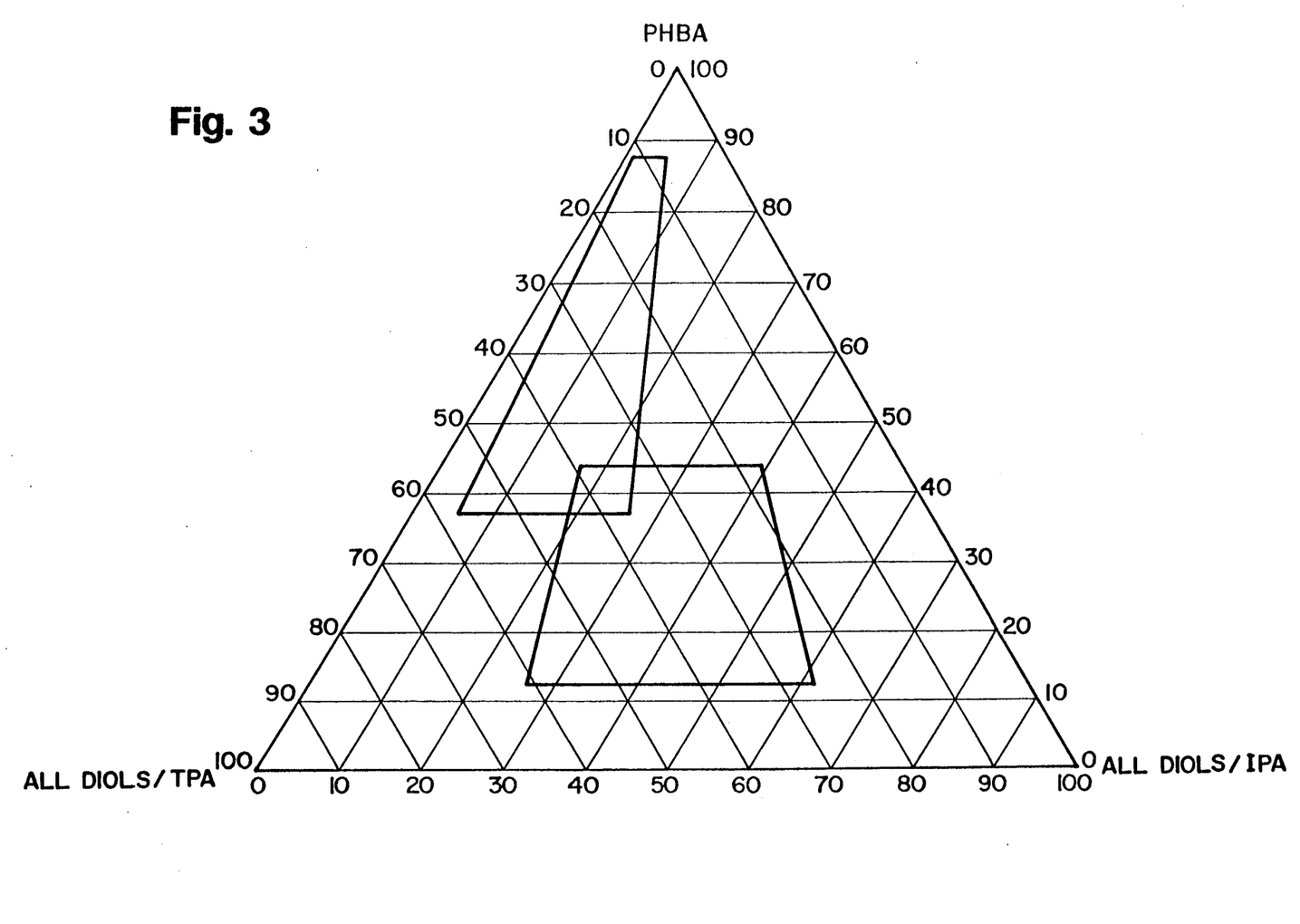

The polyesters of the instant invention are comprised of units (1)–(5)

(5)

wherein Ar is a divalent substituted mononuclear aromatic radical of the formula wherein X is independently hydrogen, a $C_1$ to $C_5$ alkyl group, a halide atom, or an aryl group such as phenyl; with the proviso that when the valence bonds are para to each other, at least one group X must be other than hydrogen; and/or a divalent dinuclear aromatic radical of the formula wherein X is as defined above, and Q is selected from the group of O, S, SO, S—S, $SO_2$, CO and a chemical bond; and/or a divalent naphthalene radical of the formula or isomers thereof. In the formulae (1)-(5) a+b is approximately equal to d+e; the ratio of a to b is in the range of about 1.4:1 to about 10:1, preferably about 1.5:1 to about 5:1; the ratio of d to e is from about 3:1 to about 21:1, preferably from about 3.5:1 to about 20:1; and c is in the range of from about 0.6 to about 7, preferably from about 0.7 to about 4, moles per each mole of monomers corresponding to the sum of units (1) and (2).

It was also unexpectedly discovered that very attractive properties are realized with polyesters comprising the units (1)-(5) wherein a+b is approximately equal to d+e; the ratio of a to b is in the range of from about 0.42:1 to about 2.33:1, preferably from about 0.75:1 to about 2:1; the ratio of d to e is in the range of from about 3:1 to about 99:1, preferably 5:1 to about 99:1 and more preferably from about 10:1 to about 70:1, and c is in the range of from about 0.15 to about 0.8 moles per each mole of monomer corresponding to the sum of units (1) and (2), preferably from about 0.25 to about 0.75 moles.

Arylene diols useful for the purposes of the instant invention are, for example, resorcinol, methylhydroquinone, chlorohydroquinone, t-butylhydroquinone, phenylhydroquinone, the 4,4'-, 4,3'-, and 3,3'-biphenols; the 4,4'-, 4,3'-, and 3,3'-dihydroxydiphenyl ethers; the 4,4'-, 4,3'-, and 3,3'-dihydroxydiphenyl sulfides; the 4,4'-, 4,3'-, and 3,3'-dihydroxydiphenyl sulfoxides; the 4,4'-, 4,3'-, and 3,3'-dihydroxydiphenyl disulfides; the 4,4'-, 4,3'-, and 3,3'-dihydroxydiphenyl sulfones; the 4,4'-, 4,3'-, and 3,3'-dihydroxybenzophenones; and the naphthalene diols; such as the 1,4-, 1,5-, 2,6-, and 2,7-naphthalene diols; the 4,4'-, 4,3'-, and 3,3'-biphenols are preferred.

The subject resins from a stable oriented melt phase at about 260° C. or higher; the melt phase is tractable and can be melt-extruded below its decomposition temperature to form quality, high-performance fibers, films, molded articles, and the like. Fabricated products show a smooth surface, and a minimal tendency to blister. The polyesters display high modulus and strength, good fiber ratings, as well as good retention of properties at high temperatures. The polymers have heat distortion temperatures of at least about 200° C., preferably at least about 220° C. when measured under a load of 264 psi.

It is important to point out that melting points and heat distortion temperatures (HDT's) are basic property parameters that determine polymer performance. Thus, a very high melting point results in materials that are either difficult to melt-fabricate or plain intractable. Low melting points lead to resins having low HDT's. For high heat applications such as ovenware, heat distortion temperature values are very important since they indicate the upper temperature at which the particular polymer is useful, especially in structural applications. Other parameters are the crystallization temperature and the rate of crystallization. Both provide an indication of how quickly the molten material develops the desirable crystallinity characteristics.

The heat distortion temperatures were determined by using the ASTM method D-648. Melting points, crystallization temperatures (also referred to as the "onsets of crystallization") and the crystallization rates were measured using X-ray techniques. A brief description follows.

The crystalline melting point is measured by following the intensity of the X-ray reflection of the most intensive peak as a function of temperature. The most intensive diffraction peak is located at a spacing of about 4.5 Å. Based on literature data [J. Polymer Sci., Polym. Chem. Ed., 14, 2207 (1976); J. Polym. Sci., Polym. Chem. Ed., 21, 2249 (1983)] the subject peak has been tentatively assigned to the distance between the polymer chains. The point at which the intensity reaches a minimum is taken for the polymer melt temperature. The rate of temperature change is 100° C. per minute.

The onset of crystallization is taken as the temperature at which there is a sharp increase in the intensity of the X-ray peak referred to above. Again, the rate of cooling is 100° C. per minute.

Crystallization rate is defined as the difference between the intensities of the above X-ray peak at the crystallization temperature and at 40° C. below that temperature, the rate of cooling being 100° C. per minute.

A detailed description of the three methods is given in the Experimental. Note that throughout this patent, all melting and crystallization data refer to the second heating/cooling cycle of the sample (see Experimental).

A surprising and unexpected feature of the copolyesters of the instant invention is their ability to yield molded materials that display good surface characteristics, good fiber ratings and generally a lowered tendency to blister.

The phenomenon of blistering has been known. Blisters may occur near a surface or in the bulk of the sample. Here, we are mainly concerned with surface blisters; note, however, that small internal blisters or voids can also be detrimental to material performance.

Moldings based on polymers that show orientation in the melt, display skin-core effects. Hence, phenomena observed in these systems are often analogous to those encountered in coatings and composites. In composites, for example, blistering and delamination occur especially between two layers of different composition. In coatings, blistering is known to be a localized delamination at an interface; it depends on the diffusion of chemicals such as water and degradation by-products. The difference in the thermal expansion coefficient between a coating and the substrate can create stresses and may weaken the interface. A blister may then form with less pressure difference due to volatiles, than in cases where these stresses are absent.

In summary thus, blistering is due to a surface layer delamination and can be caused either by trapped volatiles or by built-in stresses. Most probably both factors are at work.

Two types of blistering are encountered with polymeric materials; (1) molding blisters and (2) oven blisters. Blisters which occur during molding generally indicate the presence of degraded material. Quite often parts having acceptable surface characteristics are obtained upon molding. However, when these parts are treated at high temperatures for a certain period of time, blisters ("oven blisters") often appear. These do not necessarily indicate the presence of degraded material as a result of molding.

It is of paramount importance that molding of the polymer does not yield parts having a blistered surface. It should be noted that the configuration of a part is also quite often a factor in mold-blistering. In any event, if molding blisters are detected upon visual examination, the part will generally blister to a considerably greater extent when exposed to heat treatment. Thus, the particular molding compound is most probably of inadequate quality. If, on the other hand, a good-looking molding part is obtained, there is no assurance as to what the results of "oven testing" will be. For high-temperature applications, it is imperative that oven blistering be also either absent or significantly minimized. The oven test and the method of blister rating are described in the "Experimental."

Astonishingly, the copolyesters of the instant invention show a decreased tendency to blister—both during molding and in the oven test.

It is important to point out that the novelty of the instant invention does not residue in the use of novel monomers; the critical factor of the present invention is the discovery that polymers having a combination of outstanding characteristics can be obtained when the five monomers, i.e., p-hydroxybenzoic acid (PHBA), hydroquinone (HQ), an arylene diol, e.g., 4,4'-biphenol (BP), isophthalic acid (IA), and terephthalic acid (TA), are used in the specified ratios. Clearly, (vide supra), the existence of these very interesting materials was neither anticipated nor predicted by the existing prior art.

The synthesis of the polyesters of the instant invention is described in detail in Cottis et al., U.S. Pat. No. 3,637,595 entitled "P-Oxybenzoyl Copolyesters" and in Finestone, U.S. Pat. No. 4,742,149 entitled "Production of Melt Consistent Aromatic Polyesters"; the disclosure of the aforementioned two patents is incorporated herein by reference.

The bulk condensation of aromatic polyesters is described in the patent literature and broadly considered involves an alkanoylation step in which a suitable dicarboxylic acid, hydroxybenzoic acid and diol are reacted with an acid anhydride; a prepolymerization step in which the reaction product of the first step is polycondensed to prepare a prepolymer; and the prepolymer is thereafter heated in a third step to produce a polycondensate of the desired degree of polymerization.

Thus, in somewhat greater detail, the instant copolyesters are prepared by charging into the reactor the required amounts of isophthalic and terephthalic acids, p-hydroxybenzoic acid, hydroquinone and an arylene diol such as 4,4'-biphenol. An anhydride of a lower monocarboxylic acid, preferably an anhydride of a $C_2$ to $C_4$ monocarboxylic acid, is added in at least stoichiometric amounts. It is most preferred to use acetic anhydride; its amount is preferably from about 5 to about 20 mole percent over that required for the acetylation of all of the hydroxyl groups. The acetylation reaction takes place at about 140° C. for a period of time of from about 2 to about 6 hours. The reaction mixture is then heated to about 240° C. to about 320° C. at a rate of about 20° C. to about 40° C. per hour, and is kept at about 240° C. to about 320° C. for approximately a few minutes to about 4 additional hours. The low molecular weight polymer obtained is then solid state advanced to the required high molecular weight by heating to a temperature of from about 280° C. to about 320° C., for a period of from about one to about 24 hours.

A preferred variant as described in Finestone, U.S. Pat. No. 4,742,149 comprises adding a salt, particularly an alkaline earth metal salt or an alkali metal salt, preferably potassium sulfate, during the preparation of the resin and, particularly to the prepolymer melt prior to advancement of the final product to the desired degree of polymerization. The incorporation of stabilizing amounts of phosphites, as described in Cottis, U.S. Pat. No. 4,639,504 is also advantageous.

The polyesters of the present invention commonly exhibit end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester                    methyl ester optionally may be included at the end of the polymer chains.

The polymers may be annealed below their melting points for a period of time; or the polymers may be oxidatively crosslinked to at least some degree, if desired, by heating in an oxygen-containing atmosphere (e.g., in air) while in bulk form or as a previously shaped article at a temperature below their melting points for a limited period of time (e.g., for a few minutes).

The polyesters of the present invention tend to be substantially insoluble in all common polyester solvents such as hexafluoroisopropanol and o-chlorophenol, and accordingly are not susceptible to solution processing. They can surprisingly be readily processed by known melt-processing techniques as discussed hereafter.

The polyesters of the present invention commonly exhibit weight average molecular weights of about 2,000 to about 200,000, preferably about 10,000 to about 50,000 and most preferably about 20,000 to about 25,000. These molecular weights are determined by techniques that do not involve solutioning of the polymer, e.g., by end-group determination, and the like.

The instant polyesters can be melt-processed in the substantial absence of polymer degradation to form a variety of relatively stiff-shaped articles, e.g., molded three-dimensional articles, fibers, films, tapes, etc. The polyesters are suitable for molding applications and may be molded via standard injection-molding techniques commonly utilized when forming molded articles. Unlike the polyesters commonly encountered in the prior art, it is not essential that more severe injection-molding conditions (e.g., higher temperatures), compression-molding, impact-molding, or plasma-spraying techniques be utilized. Fibers or films may be melt-extruded. In some instances, as described in Cottis et al., U.S. Pat. No. 4,563,508, melt-fabrication may be facilitated by adding flow aids.

Molding compounds may be formed from the subject copolyesters by incorporating therein reinforcing agents and/or fillers. Representative reinforcing media include glass fibers, glass beads, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wool cellulose fibers, etc. Representative filler materials include calcium silicate, silica, clays, talc, mica, polytetrafluoroethylene, carbon black, graphite, alumina trihydrate, sodium aluminum carbonate, barium ferrite, wollastonite, titanium dioxide, etc. These molding compounds are useful in a variety of applications; for example, in cookware articles, and the like.

The polymers of this invention may contain up to 10 mole percent (based on total reactants) of carbonate linkages and/or comonomers other than (1)-(5), provided that the use of said carbonate linkages and/or comonomers does not unfavorably affect the very attractive properties of the instant copolyesters, i.e., (1) melt-processibility below the decomposition temperature; (2) a melting point of at least about 260° C.; (3) an HDT of at least about 200° C. when measured under a load of 264 psi using the method described in ASTM D-648; and (4) the ability to form molded articles having good surface characteristics and a decreased tendency to blister.

EXAMPLES

The following examples serve to give specific illustrations of the practice of this invention but they are not intended in any way to limit the scope of this invention.

A. Experimental Procedures

The following procedures were used to obtain the data given in the examples.

A.1. X-ray Measurements a) Apparatus

X-ray diffraction data were obtained using a Philips XRG-3000 X-ray generator equipped with a vertical diffractometer, a long, fine focus copper X-ray tube, a Paar HTK-10 high-temperature diffractometer attachment and a Paar HTK-Heat Controller. Diffractometer position is controlled by computer, which also measures and records radiation count rate produced by sample crystallinity and sample temperature.

b) Determination of the Polymer Melting Point

A sample of the polymer is submitted to a preliminary X-ray diffraction scan between 15 and 25 degrees two-theta angle by increasing the temperature by increments of 60° C. within a temperature range from about 200° to about 480° C. This allows determination of the approximate temperature at which the peak located at approximately 19.7 degrees two-theta (4.50 Angstroms d-spacing) reaches its minimum value, i.e., an approximate melting point. A second-degree polynomial equation is derived from the above data; this polynomial equation now allows to follow the peak angle as the sample temperature is varied. The temperature at which the peak height reaches a minimum (i.e., touches the baseline) is considered to be the melting point. The polymer sample is now heated and cooled at a rate of 100° C. per minute between the previously-mentioned temperature limits, and its melting point is determined. Since the melting point of a crystalline material often changes on heating and cooling (due to recrystallization, further polymerization, etc.) the sample is cooled and reheated. This allows determination of the melting point on the second heating cycle. Generally, the second cycle yields a melting point which remains approximately constant if additional heating or cooling cycles are performed. Therefore, the value obtained in the second heating cycle is taken as the polymer melting point.

c) Crystallization Temperature (Onset of Crystallization)

The onset of crystallization is measured in the same manner except that the scanning (for details, see above), is performed while the sample is cooled at 100° C. per minute. The temperature at which the peak emerges from the baseline during the second cooling cycle is considered as the onset of crystallization.

d) Crystallization Rate

At every temperature below the sample melting point, the intensity of X-ray diffraction of a crystalline material can be expressed as counts per second (or any unit of time). The increase in the number of counts per unit of time while the sample is being cooled at a certain rate (100° C. per minute) is therefore proportional to the rate of crystallization. A temperature interval starting at the onset of crystallization and 40° C. below that temperature was arbitrarily chosen. Rates of crystallization are expressed as the increase in counts per minute for a sample cooled within these temperature limits during the second cooling cycle.

A.2. Blister Rating

Samples to be tested are preconditioned at 20° C. to 25° C., 50±5 percent relative humidity, for 24 hours. Test sample lot normally includes 5 tensile bars (⅛" thick), 5 HDT bars (5"×½"×¼" thick) and 5 flex bars (5"×½"×¼" thick). The samples are carefully inspected and any existing cracks and/or blisters are circled. The samples are then annealed in an oven which has been equilibrated at 232° C. (450° F.), for a period of 4 hours. They are then removed, cooled and inspected. Rating codes follow:

0—no new blisters;

1—very slight blistering (one or two very small blisters);
2—slight blistering (three to six small blisters);
3—moderate blistering (a few large blisters and/or many small blisters); and
4—heavy blistering (many large or small blisters covering more than half of the specimen surface).

The numerical blister rating is calculated using the equation $$R = 1/n \sum_{i=1}^{n} X_i^2$$

where R=numerical blister rating (0–16); n=number of samples tested; and $X_i$=blister rating (0–4) of sample i.

In the above calculation the individual ratings for the entire set of test samples (tensile bars, HDT bars, flex bars) are generally treated as a single population. The ratings vary within the range of 0 (no blistering) to 16 (severe blistering, worst case).

A.3 Determination of the Fiber Rating

Fiber ratings were obtained using a hot bar apparatus with a temperature range from 270° to 415° C. A 2 to 5 gram sample of polymer is thinly and evenly sprinkled on the upper portion of the hot bar using a spatula and is allowed to melt. Using a large pair of tweezers, grab a small portion of material from the melted pool and slowly draw a fiber at a steady speed. The following rating system is used:

0—Material does not melt or does not draw a fiber
1—Material draws a short fiber with poor strength
2—Material draws an intermediate length fiber with intermediate level of tenacity or material draws a long fiber with poor strength
3—Material draws a long fiber with good strength
L—An additional rating of L is added to the rating of 0–3 if a low melt temperature occurs which indicates low molecular weight
A—An additional rating of A is added if the melted material is clear which indicates the material is amorphous in the melt state

A.4 Miscellaneous

The flexural strength and the flexural modulus of the experimental samples were measured according to the procedure of ASTM D-790-84A; HDT (DTUL) data were obtained using the method described in ASTM D-648.

EXAMPLE 1

This is an example of the synthesis of a novel polyester based on terephthalic acid (TA), isophthalic acid (IA), p-hydroxybenzoic acid (PHBA), hydroquinone (HQ), and 4,4'-biphenol (BP) in the nominal mole ratio of 0.615/0.385/0.750/0.9/0.1.

The following ingredients were combined in the manner described.

| Item | Ingredient | Amount |
|------|------------|--------|
| A | Terephthalic acid | 4.838 kg |
| B | Isophthalic acid | 3.029 kg |
| C | p-hydroxybenzoic acid | 4.905 kg |
| D | Hydroquinone | 4.693 kg |
| E | 4,4'-biphenol | 0.882 kg |
| F | Acetic anhydride | 15.295 kg |

-continued

| Item | Ingredient | Amount |
|------|------------|--------|
| G | Magnesium acetate tetrahydrate | 7.056 g |

Items A through G were charged to a 15 gallon, oil-heated vessel equipped with an anchor-type stirrer, reflux condenser, after condenser, and distillate receiver.

After purging with nitrogen, the contents were heated with stirring to 141° C. and held under reflux at that temperature for 3 hours. Distillation was then started while increasing the temperature over a 6.7 hour period to 275° C. The contents of the vessel were transferred to a sigma blade mixer that had been preheated to 305° C. After mixing for 5 hours at this temperature under an atmosphere of nitrogen, the mixer was cooled to near room temperature at which point the polymer was removed as a granular solid. The yield was 15.2 Kg (95 percent of theoretical). Examination by X-ray diffraction showed a melting temperature of 369° C., crystallization temperature of 314° C. and a crystallization rate of 560 counts per minute.

A sample of the polymer was pelletized and molded by standard techniques. The test specimens had a Heat Distortion Temperature of 268° C. and a room temperature flexural strength of 28,000 psi and room temperature flexural modulus of 2,460,000 psi. The blister rating was excellent at 1.5.

A molding composition containing 70 weight percent of the above polymer and 30 weight percent of milled glass fiber was prepared by compounding on a twin screw extruder and molded into test specimens. The heat distortion temperature (ASTM D-648) was 265° C. The room temperature flexural strength and modulus (psi) were 27,200 and 2,240,000 respectively.

COMPARATIVE EXAMPLE 1

The preparation and properties of a wholly aromatic polyester based on four components, i.e. isophthalic acid/terephthalic acid/p-hydroxybenzoic acid/hydroquinone in the nominal mole ratio of 0.4/0.6/0.5/1.0 are described.

The following ingredients were combined in a manner described:

| Item | Ingredient | Amount |
|------|------------|--------|
| A | Terephthalic acid | 5.311 kg |
| B | Isophthalic acid | 3.541 kg |
| C | p-hydroxybenzoic acid | 3.680 kg |
| D | Hydroquinone | 5.868 kg |
| E | Acetic anhydride | 15.645 kg |
| F | Magnesium acetate tetrahydrate | 0.46 g |
| G | Triphenyl phosphite | 7.36 g |

Items A through F were charged into a 15-gallon, oil heated vessel equipped with an anchor-type stirrer, reflux condenser, after condenser, injection port and distillate receiver. After purging with nitrogen, the contents were heated with stirring to 141° C. and held under reflux at that temperature for 3 hours. Distillation was then started while increasing the temperature over a 4.8 hour period to 285° C. Item G was then injected into the vessel. After an additional 15 minutes the contents of the vessel were transferred to a sigma blade mixer that had been preheated to 320° C. After mixing for 4 hours at this temperature under an atmosphere of nitrogen, the mixer was cooled to near room temperature where the contents were removed as a granular solid.

The melting point of the polymer (X-ray) was 359° C.; its crystallization temperature was 336° C. with a crystallization rate of 2400. The material was pelletized and molded into standard test specimens having a blister rating of 15.

EXAMPLES 2 TO 10 AND COMPARATIVE EXAMPLE 1 (TABLE I)

Items identified in Example 1 were the same for the following examples: 2-15 and 23-73. The polymerization procedure was similar to that of Example 1 (except for Examples 11-16, 18, and 31); the amounts of ingredients are shown in Tables I, II, and V Properties are listed in Table III and V. Crystallinity data are summarized in Table IV.

EXAMPLES 11 TO 15 (TABLE II)

Examples 11-15 use the amounts of ingredients as shown in Table II (A-G are the same monomers as Example 1). These ingredients, in the amounts shown in the table below, were charged to a 2 liter resin kettle fitted with a heating mantle, mechanical stirrer, reflux condenser, and distillate take-off apparatus. The mixture was heated to reflux and stirred for three hours. Distillation was then started and the temperature of the reaction mixture increased at the rate of 30° C. per hour until approximately 97 percent of the theoretical distillate was collected. The hot mixture was then poured into an aluminum pan to cool to a brittle sheet. The material was then pulverized to a granular powder fine enough to pass a 2 mm screen. The powder was heated-up slowly (22° C. per hour) under nitrogen to 300° C. and held for 4 hours at that temperature.

The data in Table III indicate that good high temperature performance (HDT) is obtained even at very high HQ/BP molar ratios. Contrary to the statement of the European Patent Application EP 275,324 that at molar ratios of HQ/BP higher than 1:1 "the heat resistance is poor", the melting points of the copolyesters actually have a tendency to increase with the increase of the hydroquinone content. This, in turn, indicates better (not poorer) heat resistance. Also, no experimental problems were encountered in preparing the copolyesters of the instant invention. Table IV depicts the crystallinity characteristics of the polymer of Tables I and II (Examples 1-15).

The data in Table V indicates that many of the materials of the present invention exhibit excellent fiber ratings.

In Table V, Examples 16-22 are controls or comparative examples of a polymer derived from 4 monomers. All examples in Table V (except for examples 16, 18, and 31) were prepared in the same monomer as Comparative Example 1. Examples 16, 18, and 31 were prepared in the laboratory using the procedure as shown for examples 11-15.

The following data clearly show that the instant five-component polyesters display excellent moldability characteristics and a generally lowered tendency to blister especially in glass-filled systems. Several of the materials listed exhibit vastly improved tensile and flexural strengths and moduli.

TABLE I

| | Example Number | | | | | | | | | | | |
|---|---|---|---|---|---|---|---|---|---|---|---|---|
| | 2 | | 3 | | 4 | | 5 | | 6 | | 7 | |
| Item | Mole | Wt Kg | Mole | Wt Kg | Mole | Wt Kg | Mole | Wt Kg | Mole | Wt Kg | Mole | Wt Kg |
| A | 0.585 | 4.654 | 0.850 | 6.468 | 0.585 | 2.573 | 0.850 | 3.647 | 0.5 | 4.510 | 0.5 | 4.341 |
| B | 0.415 | 3.302 | 0.150 | 1.141 | 0.415 | 1.825 | 0.150 | 0.644 | 0.5 | 4.510 | 0.5 | 4.341 |
| C | 0.750 | 4.961 | 0.750 | 4.745 | 3.000 | 10.971 | 3.000 | 10.701 | 0.4285 | 3.213 | 0.54 | 3.897 |
| D | 0.950 | 5.010 | 0.750 | 3.783 | 0.950 | 2.769 | 0.750 | 2.133 | 0.96 | 5.739 | 0.985 | 5.667 |
| E | 0.050 | 0.446 | 0.250 | 2.132 | 0.050 | 0.246 | 0.250 | 1.202 | 0.04 | 0.404 | 0.015 | 0.146 |
| F | — | 15.468 | — | 14.787 | — | 15.540 | — | 15.159 | — | 15.481 | — | 15.583 |
| G | — | 0.007 | — | 0.007 | — | 0.007 | — | 0.007 | — | 0.007 | — | 0.007 |
| HQ/BP (mole ratio) | 19:1 | | 3:1 | | 19:1 | | 3:1 | | 24:1 | | 65.6:1 | |

| | Example Number | | | | | | Comparative Example 1 | |
|---|---|---|---|---|---|---|---|---|
| | 8 | | 9 | | 10 | | | |
| Item | Mole | Wt Kg | Mole | Wt Kg | Mole | Wt Kg | Mole | Wt[a] Kg |
| A | 0.54 | 4.6477 | 0.54 | 4.6765 | 0.55 | 4.459 | 0.5 | 4.557 |
| B | 0.46 | 3.9591 | 0.46 | 3.9837 | 0.45 | 3.722 | 0.5 | 4.557 |
| C | 0.54 | 3.8641 | 0.54 | 3.8880 | 0.6 | 4.126 | 0.4285 | 3.247 |
| D | 0.95 | 5.4193 | 0.975 | 5.5964 | 0.9 | 5.044 | 1.0 | 6.040 |
| E | 0.05 | 0.482 | 0.025 | 0.243 | 0.1 | 0.927 | — | — |
| F | — | 15.449 | — | 15.545 | — | 15.433 | — | 15.642 |
| G | — | 0.007 | — | 0.007 | — | 0.007 | — | 0.007 |
| HQ/BP (mole ratio) | 19:1 | | 39:1 | | 9:1 | | ∞ | |

[a]In this example 16 grams of triphenyl phosphite stabilizer were added to the monomer charge.

TABLE II

| | Example Number | | | | | | | | | |
|---|---|---|---|---|---|---|---|---|---|---|
| | 11 | | 12 | | 13 | | 14 | | 15 | |
| Item | Mole Ratio | Wt gms | Mole Ratio | Wt gms | Mole Ratio | Wt gms | Mole Ratio | Wt gms | Mole Ratio | Wt gms |
| A | 0.6075 | 205.9 | 0.6150 | 196.1 | 0.6225 | 187.3 | 0.6300 | 179.5 | 0.6375 | 165.9 |
| B | 0.3925 | 133.0 | 0.3850 | 122.7 | 0.3775 | 113.6 | 0.3700 | 105.4 | 0.3625 | 94.3 |

TABLE II-continued

| | Example Number | | | | | | | | | |
|---|---|---|---|---|---|---|---|---|---|---|
| | 11 | | 12 | | 13 | | 14 | | 15 | |
| Item | Mole Ratio | Wt gms | Mole Ratio | Wt gms | Mole Ratio | Wt gms | Mole Ratio | Wt gms | Mole Ratio | Wt gms |
| C | 0.6250 | 176.1 | 0.7500 | 198.8 | 0.8750 | 218.9 | 1.0000 | 236.9 | 1.1250 | 243.4 |
| D | 0.9500 | 213.4 | 0.9000 | 190.2 | 0.8500 | 169.5 | 0.8000 | 151.1 | 0.7500 | 129.4 |
| E | 0.05 | 19.0 | 0.1000 | 35.7 | 0.1500 | 50.6 | 0.2000 | 63.9 | 0.2500 | 72.9 |
| F | — | 587.5 | — | 581.2 | — | 575.6 | — | 570.5 | — | 565.9 |
| G | — | 0.2682 | — | 0.2682 | — | 0.2682 | — | 0.2682 | — | 0.2682 |
| HQ/BP (mole ratio) | 19:1 | | 9:1 | | 5.6:1 | | 4:1 | | 3:1 | |

TABLE III

Polymer Properties of Examples from Table I

| Ex. No. | Description[a] | HQ/BP mole ratio | Blister Rating | Flexural Strength (psi) | Flexural Modulus (psi × 10^6) | Tensile Strength (psi) | Tensile Modulus (psi × 10^6) | Elongation (%) | HDT (°C.) |
|---|---|---|---|---|---|---|---|---|---|
| 2 | Neat | 19:1 | 8.6 | 12,180 | 1.14 | 6,210 | 1.51 | 0.4 | 220 |
|   | 30% glass filled | | 5.2 | 14,750 | 1.61 | 8,890 | 1.86 | 0.6 | 227 |
| 3 | Neat | 3:1 | — | — | — | — | — | — | — |
|   | 30% glass filled | | — | — | — | — | — | — | — |
| 4 | Neat | 19:1 | 10.6 | 10,870 | 1.67 | — | — | — | 210 |
|   | 30% glass filled | | 8.5 | 9,770 | 1.43 | — | — | — | 225 |
| 5 | Neat | 3:1 | 9.0 | 11,600 | 1.37 | — | — | — | 283 |
|   | 30% glass filled | | 3.8 | 9,660 | 1.17 | — | — | — | 262 |
| 6 | Neat | 24:1 | 2.2 | 26,240 | 2.0 | 19,300 | 3.14 | 0.7 | 227 |
|   | 30% glass filled | | 0.1 | 22,990 | 2.0 | 17,750 | 2.77 | 1.1 | 250 |
| 7 | Neat | 65.6:1 | 3.1 | 17,670 | 1.43 | — | — | — | 251 |
|   | 30% glass filled | | 15.0 | 20,160 | 1.91 | — | — | — | 231 |
| 8 | Neat | 19:1 | 1.1 | 24,330 | 1.97 | 20,520 | 2.7 | 0.9 | 244 |
|   | 30% glass filled | | 4.5 | 22,020 | 2.08 | 14,560 | 2.8 | 0.8 | 256 |
| 9 | Neat | 39:1 | 8.3 | 24,502 | 2.24 | 14,670 | 2.26 | 0.84 | 246 |
|   | 30% glass filled | | 9.0 | 20,980 | 2.20 | 15,960 | 2.45 | 1.0 | 255 |
| 10 | Neat | 9:1 | — | — | — | — | — | — | — |
|   | 30% glass filled | | 0.3 | — | — | — | — | — | — |
| Comparative Example 1 | Neat | ∞ | 8.0 | 16,990 | 1.4 | 6,320 | 1.63 | 0.4 | 245 |
|   | 30% glass filled | | 9.6 | 15,670 | 1.83 | 11,360 | 2.18 | 0.61 | 268 |

[a] Henry and Frick, 1/16" milled glass fiber.

TABLE IV

Crystallinity Data of Examples from Tables I and III

| Example No. | HQ/BP[1] (molar ratio) | Tm (°C.) | Onset of Crystallization (°C.) | Rate of Crystallization (counts/minute) |
|---|---|---|---|---|
| 1 | 9:1 | 369 | 314 | 560 |
| 2 | 19:1 | 375 | 319 | 1216 |
| 3 | 3:1 | 410 | 362 | 1760 |
|   | (not a representative sample - low MW) | | | |
| 4 | 19:1 | 406 | 351 | 3052 |
| 5 | 3:1 | 398 | 372 | 3000 |
| 6 | 24:1 | 341 | 281 | 413 |
| 7 | 65.6:1 | 308 | 285 | 667 |
| 8 | 9:1 | 394 | 316 | 600 |
| 9 | 39:1 | 363 | 315 | 520 |
| 10 | 9:1 | 338 | 270 | 338 |
| 11 | 19:1 | 318 | 306 | 790 |
| 12 | 9:1 | 306 | 291 | 789 |
| 13 | 5.6:1 | 297 | 281 | 560 |
| 14 | 4:1 | 298 | 268 | 616 |
| 15 | 3:1 | 261 | 258 | 483 |
| Comparative Example 1 | ∞ | 339 | 290 | 583 |

[1] HQ = hydroquinone; BP = 4,4'-biphenol.

TABLE V

| No. | A TPA | B IPA | C PHBA | D HQ | E BP | FIBER RATING | HQ:BP |
|---|---|---|---|---|---|---|---|
| CONTROLS | | | | | | | |
| 16. | .55 | .45 | 0.60 | 1.02 | — | 0 | |
| 17. | .50 | .50 | 0.60 | 1.015 | — | 1 | |
| 18. | .54 | .46 | 0.54 | 1.00 | — | 0 | |
| 19. | .50 | .50 | 0.4285 | 1.015 | — | 2 | |
| 20. | .50 | .50 | 0.4285 | 1.015 | — | 1 | |
| 21. | .50 | .50 | 0.4285 | 1.015 | — | 2 | |
| 22. | .50 | .50 | 0.4285 | 1.015 | — | 0 | |
| 23. | .85 | .15 | 3.0 | 0.75 | .25 | 0 | 3:1 |
| 24. | .585 | .415 | 3.0 | 0.95 | .05 | 0 | 19:1 |
| 25. | .80 | .20 | 1.5 | 0.60 | .40 | 2+ | 1.5:1 |
| 26. | .85 | .15 | 0.75 | 0.75 | .25 | 2 | 3:1 |
| 27. | .615 | .385 | 0.75 | 0.90 | .10 | 2 | 9:1 |
| 28. | .615 | .385 | 0.75 | 0.90 | .10 | 1 | 9:1 |
| 29. | .585 | .415 | 0.75 | 0.95 | .05 | 1 | 19:1 |
| 30. | .585 | .415 | 0.75 | 0.95 | .05 | 0 | 19:1 |
| 31. | .6075 | .3925 | 0.625 | 0.95 | .05 | 0 | 19:1 |
| 32. | .55 | .45 | 0.625 | 0.975 | .025 | 1 | 39:1 |
| 33. | .55 | .45 | 0.625 | 0.975 | .025 | 0 | 39:1 |
| 34. | .55 | .45 | 0.60 | 0.90 | .10 | 2 | 9:1 |
| 35. | .55 | .45 | 0.60 | 0.93 | .07 | 3 | 13:1 |
| 36. | .55 | .45 | 0.60 | 0.94 | .06 | 3 | 16:1 |
| 37. | .55 | .45 | 0.60 | 0.925 | .075 | 3 | 12:1 |
| 38. | .55 | .45 | 0.60 | 0.92 | .08 | 3 | 12:1 |
| 39. | .55 | .45 | 0.60 | 0.915 | .085 | 2 | 11:1 |
| 40. | .55 | .45 | 0.60 | 0.90 | .10 | 3 | 9:1 |
| 41. | .55 | .45 | 0.60 | 0.90 | .10 | 3 | 9:1 |
| 42. | .55 | .45 | 0.60 | 0.93 | .07 | 3 | 13:1 |
| 43. | .50 | .50 | 0.60 | 0.92 | .08 | 1 | 12:1 |
| 44. | .54 | .46 | 0.54 | 0.95 | .05 | 2 | 19:1 |
| 45. | .54 | .46 | 0.54 | 0.95 | .05 | 1 | 19:1 |
| 46. | .54 | .46 | 0.54 | 0.95 | .05 | 2 | 19:1 |
| 47. | .54 | .46 | 0.54 | 0.95 | .05 | 2 | 19:1 |
| 48. | .54 | .46 | 0.54 | 0.975 | .025 | 1 | 39:1 |
| 49. | .54 | .46 | 0.54 | 0.975 | .025 | 1 | 39:1 |
| 50. | .54 | .46 | 0.54 | 0.975 | .025 | 1 | 39:1 |
| 51. | .50 | .50 | 0.54 | 0.985 | .015 | 1+ | 66:1 |
| 52. | .50 | .50 | 0.54 | 0.97 | .03 | 1 | 32:1 |

TABLE V-continued

| No. | A TPA | B IPA | C PHBA | D HQ | E BP | FIBER RATING | HQ:BP |
|---|---|---|---|---|---|---|---|
| 53. | .50 | .50 | 0.5400 | 0.97 | .03 | 2+ | 32:1 |
| 54. | .50 | .50 | 0.4285 | 0.96 | .04 | 1 | 24:1 |
| 55. | .50 | .50 | 0.4285 | 0.96 | .04 | 2 | 24:1 |
| 56. | .50 | .50 | 0.4285 | 0.96 | .04 | 2+ | 24:1 |
| 57. | .50 | .50 | 0.4285 | 0.96 | .04 | 3 | 24:1 |
| 58. | .50 | .50 | 0.4285 | 0.96 | .04 | 2 | 24:1 |
| 59. | .50 | .50 | 0.4285 | 0.96 | .04 | 2 | 24:1 |
| 60. | .50 | .50 | 0.4285 | 0.96 | .04 | 3 | 24:1 |
| 61. | .50 | .50 | 0.4285 | 0.96 | .04 | 2 | 24:1 |
| 62. | .50 | .50 | 0.4285 | 0.96 | .04 | 3 | 24:1 |
| 63. | .50 | .50 | 0.4285 | 0.96 | .04 | 1 | 24:1 |
| 64. | .50 | .50 | 0.4285 | 0.96 | .04 | 3 | 24:1 |
| 65. | .50 | .50 | 0.4285 | 0.96 | .04 | 2 | 24:1 |
| 66. | .50 | .50 | 0.4285 | 0.96 | .04 | 3 | 24:1 |
| 67. | .50 | .50 | 0.4285 | 0.96 | .04 | 3 | 24:1 |
| 68. | .50 | .50 | 0.4285 | 0.96 | .04 | 3 | 24:1 |
| 69. | .50 | .50 | 0.4285 | 0.96 | .04 | 2 | 24:1 |
| 70. | .50 | .50 | 0.4285 | 0.96 | .04 | 2 | 24:1 |
| 71. | .50 | .50 | 0.4285 | 0.96 | .04 | 3 | 24:1 |
| 72. | .50 | .50 | 0.4285 | 0.87 | .13 | 2L | 7:1 |
| 73. | .50 | .50 | 0.4285 | 0.87 | .13 | 2L | 7:1 |

We claim:

1. A wholly aromatic polyester comprising the units (1), (2), (3), (4) and (5)

(1)  (2)

(3)  (4)

(5)

wherein Ar comprises at least one member selected from the group consisting of I, a divalent substituted mononuclear aromatic radical of the formula wherein X is independently hydrogen, a $C_1$ to $C_5$ alkyl group, a halide atom or an aryl group; with the proviso that when the valence bonds are para to each other at least one group X must be other than hydrogen; and II, a divalent dinuclear aromatic radical of the formula wherein X is as previously defined, and Q is selected from the group consisting of O, S, SO, S—S, $SO_2$, CO or Q represents a chemical bond; and III, a divalent naphthalene radical of the formula or isomers thereof, and wherein a+b is approximately equal to d+e; the ratio of a to b being in the range of from about 0.42:1 to about 2.33:1; the ratio of d to e being in the range of from about 5:1 to about 99:1; and c being in the range of from about 0.15 to about 0.8 moles per each mole of monomers corresponding to the sum of units (1) and (2).

2. A wholly aromatic polyester as defined in claim 1 which has a melting point of at least about 260° C., a heat distortion temperature of at least about 200° C. when measured under a load of 264 psi, and which yields molded articles having good surface characteristics.

3. A process for preparing the polyester of claim 1 which comprises reacting terephthalic acid, isophthalic acid, p-hydroxybenzoic acid, hydroquinone, and an arylene diol other than hydroquinone with an anhydride of a lower monocarboxylic acid to form a prepolymer, followed by solid state advancement of said prepolymer to the desired high molecular weight polyester.

4. A wholly aromatic polyester as defined in claim 1 wherein the group Ar consists essentially of biphenylene.

5. A wholly aromatic polyester as defined in claim 1 wherein the group Ar consists essentially of at least one member selected from wherein Y is methyl, chlorine, t-butyl or phenyl.

6. A wholly aromatic polyester as defined in claim 1 wherein the group Ar consists essentially of at least one member selected from wherein Q is O, S, SO, S—S, $SO_2$, CO or a chemical bond.

7. A wholly aromatic polyester as defined in claim 1 wherein the group Ar consists essentially of at least one member selected from 8. A molding compound formed from the copolyester of claim 1 and at least one agent selected from glass fibers, asbestos, graphitic carbon fibers, amorphous carbon fibers, glass beads, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wool cellulose fibers, calcium silicate, silica, clays, talc, mica, polytetrafluoroethylene, carbon black, graphite, alumina trihydrate, sodium aluminum carbonate, barium ferrite, wollastonite and titanium dioxide.

9. An ovenware article comprising the molding compound of claim 8.